US009832314B2

(12) United States Patent
Shanmugam et al.

(10) Patent No.: US 9,832,314 B2
(45) Date of Patent: Nov. 28, 2017

(54) CUSTOMER REPRESENTATIVE REMOTE ACCESS FOR TROUBLESHOOTING SMARTPHONES

(71) Applicant: Verizon Patent and Licensing Inc., Arlington, VA (US)

(72) Inventors: Sankar Shanmugam, Dayton, NJ (US); Amit Kumar Shukla, Piscataway, NJ (US); Gayathri Chandrasekaran, Somerset, NJ (US); Zulfiqer Sekender, Edison, NJ (US); Sudhin Vellooparambil Latheef, Hillsborough, NJ (US); Ying Sun, Hudson, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/962,418

(22) Filed: Dec. 8, 2015

(65) Prior Publication Data

US 2017/0163806 A1 Jun. 8, 2017

(51) Int. Cl.
*H04M 3/00* (2006.01)
*H04M 3/51* (2006.01)
*H04L 29/08* (2006.01)
*H04L 29/06* (2006.01)
*H04W 12/06* (2009.01)
(Continued)

(52) U.S. Cl.
CPC .......... *H04M 3/5183* (2013.01); *H04L 63/08* (2013.01); *H04L 67/2804* (2013.01); *H04M 3/5125* (2013.01); *H04W 12/06* (2013.01); *H04L 67/02* (2013.01); *H04M 1/72555* (2013.01); *H04M 2203/053* (2013.01);
(Continued)

(58) Field of Classification Search
CPC ............. G06F 9/4445; G06F 2209/544; G06F 2209/545; G06F 3/1454; G06F 3/0481; G06F 9/45533; H04L 67/08; H04L 67/02; H04L 29/06; H04L 63/08; H04L 67/42; H04L 67/10
USPC ............... 709/203, 224, 202, 217, 219, 225; 715/740, 751, 764, 790; 370/352
See application file for complete search history.

(56) References Cited

U.S. PATENT DOCUMENTS 9,038,015 B1 * 5/2015 Allsbrook ................. G06F 8/35
717/100
2007/0082664 A1 * 4/2007 Landschaft ......... H04M 3/5133
455/426.1
(Continued)

*Primary Examiner* — Md S Elahee
*Assistant Examiner* — Kharye Pope

(57) ABSTRACT

A middleware device opens, based on an assistance call from a mobile device, a first leg of a websocket with a system associated with a call center customer representative, and sends a SMS text message to the mobile device that includes a first authentication token. The middleware device receives, while attempting to establish a second leg of the websocket between the first middleware device and the mobile device, a second authentication token from the mobile device, authenticates the mobile device based on the second authentication token, and opens the second leg of the websocket between the middleware device and the mobile device based on whether the authentication is successful. The middleware device receives a captured display screen from the mobile device via the second leg of the websocket, and sends the captured display screen to the system associated with the customer representative via the first leg of the websocket.

19 Claims, 13 Drawing Sheets

(51) Int. Cl.
*H04M 5/00* (2006.01)
*G06F 3/00* (2006.01)
*H04L 12/66* (2006.01)
*H04M 1/725* (2006.01)
*H04W 4/12* (2009.01)

(52) U.S. Cl.
CPC ............... *H04M 2203/1033* (2013.01); *H04M 2207/18* (2013.01); *H04W 4/12* (2013.01)

(56) References Cited

U.S. PATENT DOCUMENTS

| | | | | |
|---|---|---|---|---|
| 2009/0196406 A1* | 8/2009 | Brown | ................ | H04M 7/0027 379/93.17 |
| 2009/0235342 A1* | 9/2009 | Manion | ................... | H04L 67/08 726/7 |
| 2009/0319598 A1* | 12/2009 | Mittel | ................... | H04L 67/025 709/202 |
| 2011/0249081 A1* | 10/2011 | Kay | ................... | H04M 3/5315 348/14.03 |
| 2012/0072971 A1* | 3/2012 | Zhang | ................... | H04W 8/186 726/4 |
| 2013/0138765 A1* | 5/2013 | Fielding | ................. | H04L 63/10 709/217 |
| 2013/0185784 A1* | 7/2013 | Tamura | ............... | H04L 63/0815 726/9 |
| 2013/0244632 A1* | 9/2013 | Spence | ................... | H04M 3/51 455/415 |
| 2013/0262935 A1* | 10/2013 | Kutchuk | ............. | G06F 11/3438 714/39 |
| 2013/0263287 A1* | 10/2013 | Ayyalasomayajula | ..................... | H04W 8/245 726/30 |
| 2014/0254788 A1* | 9/2014 | Annapareddy | ..... | H04M 3/5183 379/265.09 |
| 2014/0304324 A1* | 10/2014 | Hirata | ..................... | H04L 67/02 709/203 |
| 2015/0156149 A1* | 6/2015 | Keith | ...................... | H04L 51/08 709/206 |
| 2015/0289152 A1* | 10/2015 | Shanmugam | ......... | H04W 24/06 455/425 |
| 2015/0319178 A1* | 11/2015 | Desai | .................... | H04L 63/105 726/1 |
| 2015/0382195 A1* | 12/2015 | Grim | ...................... | H04L 63/08 726/4 |
| 2016/0119379 A1* | 4/2016 | Nadkarni | ............... | G06N 5/045 726/1 |
| 2016/0182721 A1* | 6/2016 | Khalatian | ........... | H04M 3/5191 379/265.09 |
| 2016/0378417 A1* | 12/2016 | Kenjalkar | ............. | G06F 3/1423 345/2.2 |

\* cited by examiner

CUSTOMER REPRESENTATIVE REMOTE ACCESS FOR TROUBLESHOOTING SMARTPHONES

BACKGROUND

Cellular networks are now so ubiquitous that wireless connectivity, either via a voice or data connection, is available in most regions throughout the United States. In conjunction with the rise of cellular network coverage and reliability has been the increasing sophistication and power of cellular telephones. Cellular telephones have become devices that, in addition to permitting voice calls, texting, and Internet surfing, also have the capability to download and execute applications having functionality that can nearly rival the performance and functionality of full-size computers.

To deal with customer problems relating to use of the cellular network or their cellular telephones, cellular network providers have created customer call centers that include customer representatives that interact with the customers to resolve various problems. Such customer call centers may handle tens of thousands of calls every day, with the reasons for the customer calls varying from complex issues, like the customer having device issues that require in-depth handling, to simple issues such as the customer needing assistance in entering the appropriate settings in order to connect to an external device via Bluetooth. To contact a customer call center for a cellular network provider, a customer may dial a specific 1-800 toll free number, and the customer representative, upon receipt of the call, verbally interacts with the customer to resolve the particular network or device-related issue about which the customer is calling.

DETAILED DESCRIPTION OF THE PREFERRED EMBODIMENTS

Figure 1:
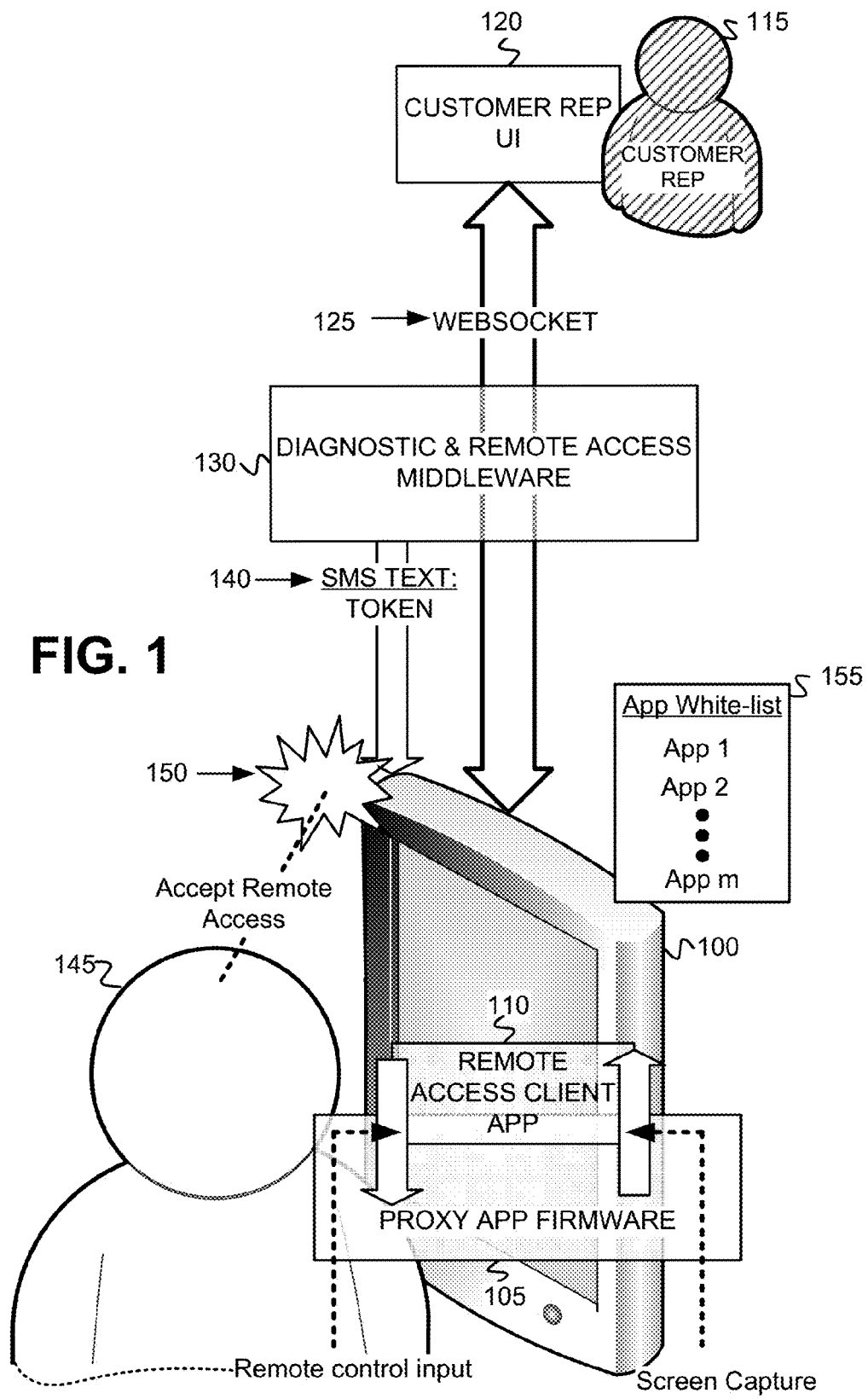
FIG. 1 depicts an overview of middleware that permits a customer representative to retrieve diagnostic data from a mobile device, and to engage in a remote access process authorized by the customer at the mobile device.

The following detailed description refers to the accompanying drawings. The same reference numbers in different drawings may identify the same or similar elements. The following detailed description does not limit the invention.

As described herein, a call center customer representative may, via intermediary middleware, remotely access a mobile device such that the customer representative may view captured screen displays of the mobile device, or may remotely control certain applications (apps) executing at the mobile device. The apps that may be remotely controlled at a given mobile device may be selected, from a set of apps installed on the mobile device, for placement in a "white-list" that lists the apps that the call center customer representative is authorized to remotely control via remote access. The selection of the apps to be placed on the "white-list" may, in one implementation, occur transparently to the customer that owns and/or uses the mobile device, and may be performed from the mobile network. The call center customer representative may remotely view, via remote access, apps and data displayed at the mobile device by the customer granting the representative viewing access, regardless of whether any particular app is placed on the "white-list."

To enable the remote access of a mobile device, a proxy app may be distributed to the mobile device via a firmware upgrade, and a remote access client app that interacts with the proxy app may be downloaded to the mobile device. The proxy app captures screen displays at the mobile device and provides the captured screen displays to the remote access client app for transmission to the call center customer representative via intermediary middleware. The proxy app additionally receives remote control inputs, sent from the call center customer representative via the intermediary middleware, from the remote access client app, and controls operations of the mobile device based on the remote control inputs. The remote access provided by the embodiments described herein enables either a "view only" mode, in which the call center customer representative may only view the captured screen displays from the mobile device, or a "control" mode in which the call center customer representative may view the captured screen displays from the mobile device and also provide remote control input that controls certain aspects of the operation of the mobile device associated with apps executing on the mobile device.

The intermediary middleware, based on a remote access request from the call center customer representative, may send a Short Message Service (SMS) text message to the mobile device and, upon customer acceptance of the request for a remote access connection at the mobile device, authenticates the customer and opens a websocket between the middleware and the remote access client app executing at the mobile device. The captured screen displays of the mobile device, and the remote control input from the call center customer representative for controlling the operation of the mobile device, may then be transmitted over the websocket from the middleware.

FIG. 1 depicts an overview of middleware that permits a customer representative to retrieve diagnostic data from a mobile device, and to engage in a remote access process. "Middleware," as referred to herein, includes a layer of software, executed on a network device, that lies between an operating system and applications on each side of a distributed network and that acts as a bridge between distributed operating systems, databases and applications over the network. The middleware, during a "control" mode of the remote access process, permits the customer representative to "inject" input and commands into the mobile device. As shown in FIG. 1, a mobile device 100 may include a proxy app firmware 105, resident in device firmware, and a remote access client app 110 that interacts with proxy app firmware 105. Proxy app firmware 105 may include code that executes functionality for capturing mobile device 100's screen display and for receiving and implementing customer representative remote control input. Proxy app firmware 105 may be distributed to mobile device 100 via a firmware upgrade or by some other process. Remote access client app 110 interacts with proxy app firmware 105 to implement diagnostic data retrieval and remote access via a wireless communication interface of mobile device 100 and via an external network (not shown).

As shown in the simplified example of FIG. 1, a customer representative 115 uses a customer representative user interface (UI) to open a first leg of a websocket 125 with diagnostic and remote access middleware 130. Middleware 130 may include one or more network devices, resident in an external network (not shown), that act as middleware intermediaries between UI 120 and mobile device 100. Middleware 130, in turn, sends a SMS text message 140 to mobile device 100, that includes an authentication token. Mobile device 100 engages in opening a second leg of websocket 125 by sending the previously received authentication token to middleware 130. Upon validation of the authentication token from SMS text message 140 by middleware 130, the second leg of the websocket 125 is established. Websocket 125, therefore, includes a first leg from UI 120 to middleware 130, and a second leg from middleware 130 to remote access client app 110 at mobile device 100. A "websocket," as referred to herein, involves implementing a protocol that provides a full duplex communication channel(s) over a single connection (e.g., Transmission Control Protocol (TCP) connection), such as is standardized in Request for Comments (RFC) 6455 by the Internet Engineering Task Force (IETF). Upon validation of the authentication token received from mobile device 100 by middleware 130, middleware 130 establishes the remote access by customer representative 115 via websocket 125. Captured screen displays are passed from proxy app firmware 105 to remote access client app 110, to middleware 130 via the second leg of websocket 125, and on to UI 120 via the first leg of websocket 125.

Remote control input (e.g., operational commands, function selections, etc.) received from customer representative 115 via UI 120 may be passed via the first leg of websocket 125 to middleware 130 which, in turn, passes the remote control input via the second leg of websocket 135 to remote access client app 110 at mobile device 100. Remote access client app 110 permits remote control of any of the apps listed in app white-list 155. Websocket 125, therefore, provides two-way, full duplex communication between UI 120 and remote access client app 110 of mobile device 100. The apps listed in app white-list 155 may be designated by default (e.g., pre-specified by the mobile network operator), and/or may be manually selected by a network administrator or operator.

The remote access to mobile device 100 by customer representative 115 shown in FIG. 1 represents a simplified overview. Further details of the retrieval of diagnostic data, passing of captured screen displays, and passing of remote control input to remote access client app 110 from customer representative 115 is described in further detail below.

Figure 2:
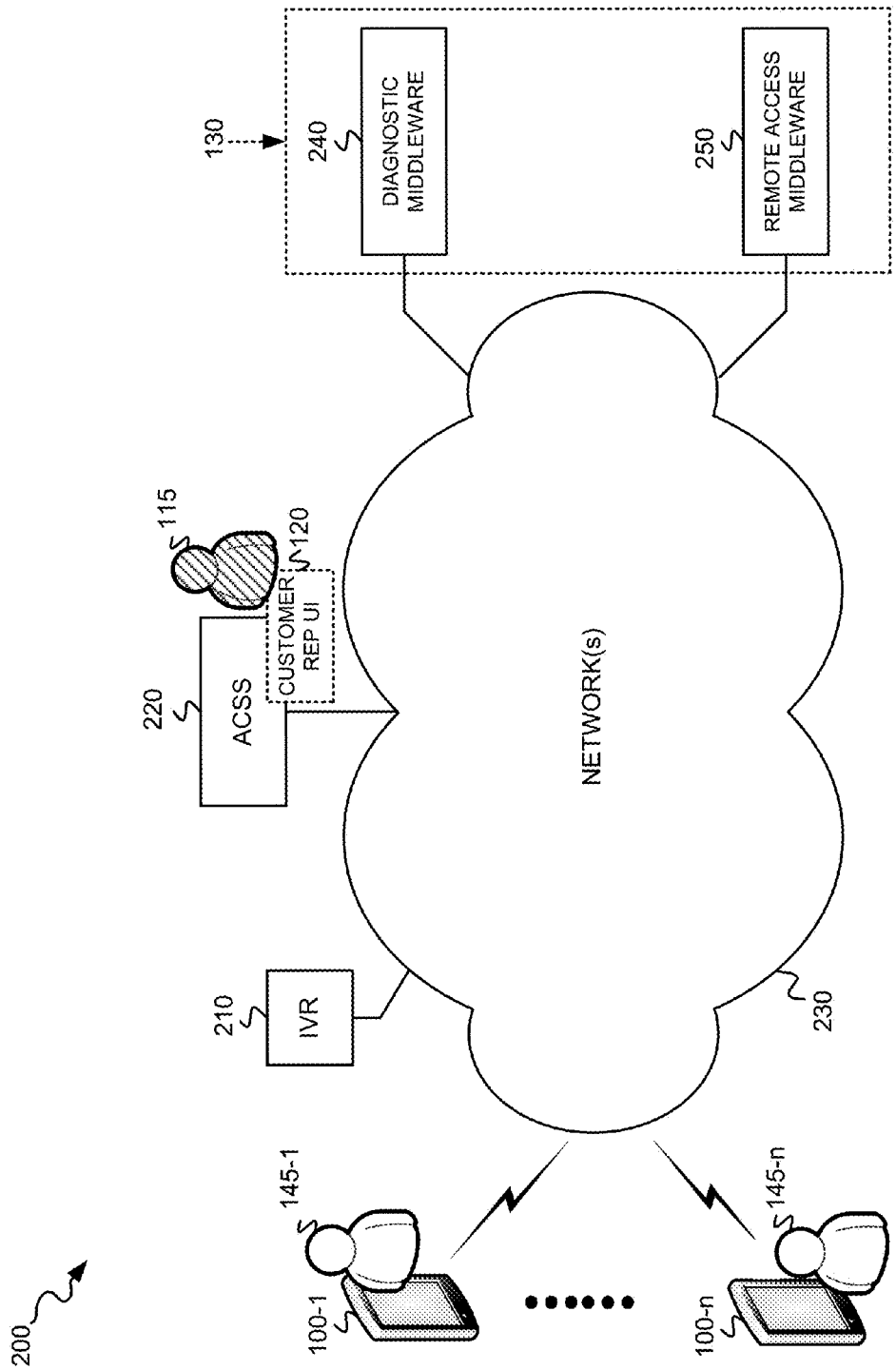
FIG. 2 depicts an exemplary network environment in which middleware may operate as an intermediary to facilitate device display screen capture and remote access input control between a call center customer representative and mobile devices.

FIG. 2 depicts an exemplary network environment 200 in which middleware 130 may operate as an intermediary to facilitate device display screen capture and remote access input control between customer representative 115 and mobile devices 100-1 through 100-n. Network environment 200 may include multiple mobile devices 100-1 through 100-n (generically called "mobile device 100" or "mobile devices 100" herein), an Interactive Voice Response (IVR) system 210, an Automated Customer Support System (ACSS) 220, diagnostic and remote access middleware 130, and a network(s) 230.

Mobile devices 100 may each include any type of device that performs digital computations and which has wireless capability, such as, for example, a cellular telephone (e.g., a "smart-phone"), a computer (desktop, laptop, palmtop, or tablet computer), a gaming device (e.g., Xbox or Playstation), a media playing device, a camera, a vehicle mounted cellular telephone, or a video-camera.

IVR system 210 includes one or more network devices that implement an automated, interactive system that enables customers to interact, via telephone keypad or speech recognition, with an information system that provides information to calling customers, and which also connects the customers through to specific destination telephone numbers (e.g., to a customer call center). IVR system 210 may, in some implementations, connect a calling customer through to a customer representative in a call center in the case of a customer seeking assistance (e.g., troubleshooting a problem with mobile device 100).

ACSS 220 includes one or more network devices that implement an automated, interactive system that enables customers to interact, via telephone keypad or speech recognition, with a queuing system that queues calling customers and then connects them to an available call center customer representative. When queued by ACSS 220, calling customers are placed "on hold" until an active call center customer representative becomes available to handle the customer call.

Diagnostic and remote access middleware 130 may include diagnostic middleware 240 and remote access middleware 250 that may connect to network(s) 230. Diagnostic middleware 240 may include one or more network devices that, as described in further detail below with respect to FIGS. 6A-6C and FIG. 7, receive requests for diagnostic data related to the operation of a mobile device 100, request diagnostics access to the mobile device 100, receive diagnostics data from the mobile device 100, and provides the diagnostics data to customer representative UI 120 for presentation to customer representative 115. Remote access middleware 250 may include one or more network devices that, as described in further detail below with respect to FIGS. 6A-6C, 7 and 8, establish a websocket between customer representative UI 120 and mobile device 100 enabling UI 120 to receive captured screen displays from mobile device 100 and to provide remote control input to mobile device 100 via the websocket and via intermediary remote access middleware 250. As shown in FIG. 2, diagnostic middleware 240 may be implemented by one or more network devices that are separate and distinct network devices from the one or more network devices that implement remote access middleware 250. In other implementations, however, diagnostic middleware 240 and remote access middleware 250 may be implemented by the same one or more network devices.

In additional implementations, the functionality of, and operations performed by, diagnostic middleware 240 and remote access middleware 250 may be distributed among multiple different network devices. For example, diagnostic middleware 240 may be implemented as two separate middleware components executing on two different network devices. As a further example, remote access middleware 250 may be implemented as two separate middleware components executing on two different network devices. Diagnostic middleware 240 and remote access middleware 250 may each handle numerous (e.g., millions) of parallel/simultaneous connections, and may load balance traffic based on mobile device Mobile Directory Numbers (MDNs). Middleware 240 and 250 may dynamically "throttle" the rate at which they receive incoming frames, associated with captured screen displays, to match the rate at which the frames are processed by UI 120. This prevents frames from accumulating at middleware 240 or 250 and overloading local memory.

Network(s) 230 may include one or more networks including, for example, one or more public land mobile networks (PLMNs), one or more telecommunications networks (e.g., Public Switched Telephone Networks (PSTNs)), one or more local area networks (LANs), one or more wide area networks (WANs), one or more metropolitan area networks (MANs), one or more intranets, the Internet, or one or more cable networks (e.g., optical cable networks). The PLMN(s) enables voice calls and data transfer between mobile devices 100, and other destination devices (not shown), and between mobile devices 100 and IVR 210 and/or customer representative 115 at a customer call center. The PLMN(s) may include any type of PLMN, such as, for example, a Code Division Multiple Access (CDMA) 2000 PLMN, a Global System for Mobile Communications (GSM) PLMN, a Long Term Evolution (LTE) PLMN or other types of PLMNs. In one embodiment, networks(s) 230 may include a PLMN connected to the Internet, where mobile devices 100 connect to the PLMN via wireless connections.

The configuration of network components of network environment 200 illustrated in FIG. 2 is for illustrative purposes. Other configurations may be implemented. Therefore, network environment 200 may include additional, fewer and/or different components that may be configured in a different arrangement than that depicted in FIG. 2. For example, though a single customer 145 is depicted as being associated with a single mobile device 100, a single customer 145 may be associated with (i.e., the owner and user of) multiple different mobile devices 100.

Figure 3:
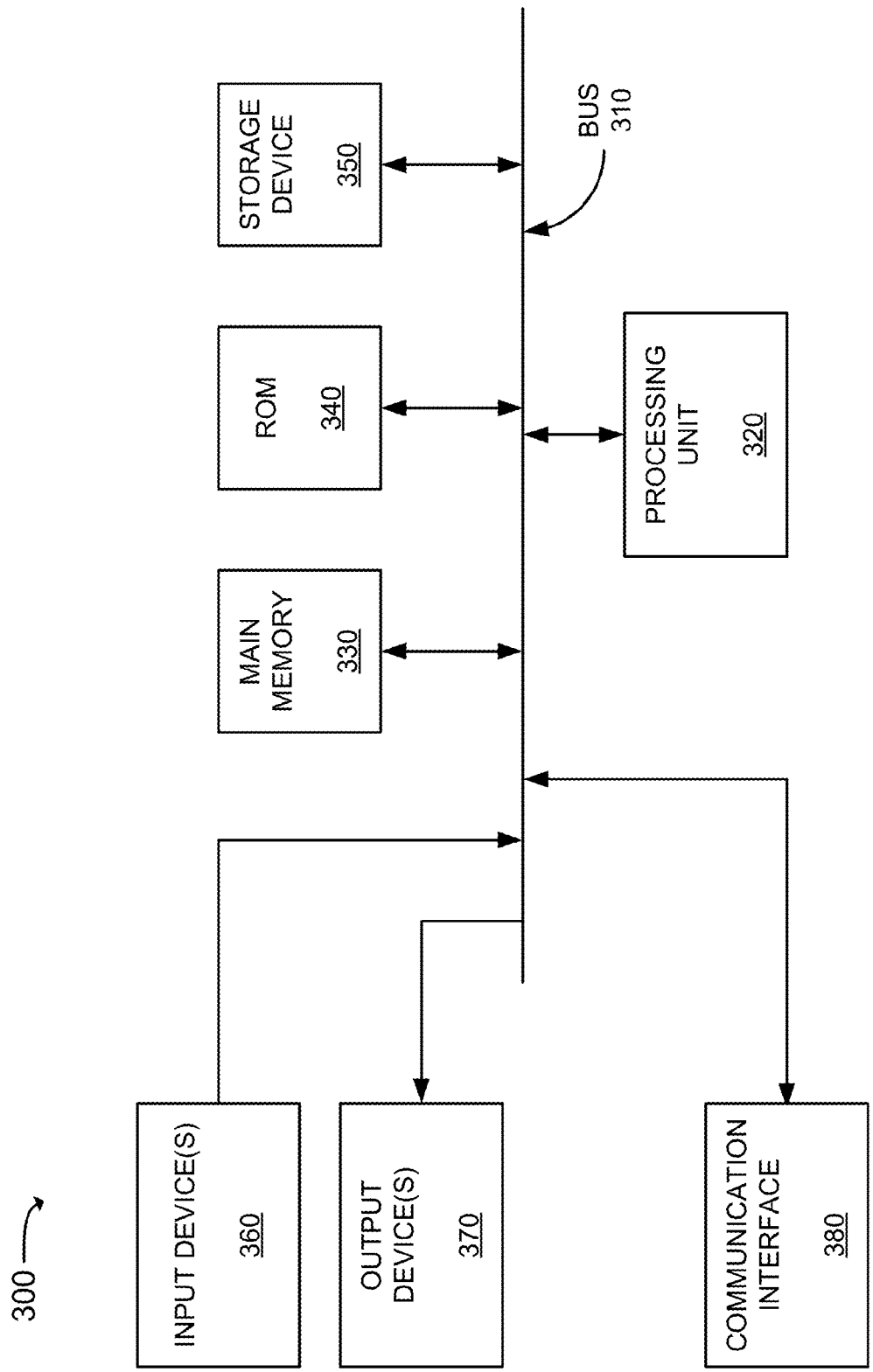
FIG. 3 is a diagram that depicts exemplary components of a device that corresponds to the mobile devices, interactive voice response system, automated customer support system, and middleware of FIG. 2.

FIG. 3 is a diagram that depicts exemplary components of a device 300. Mobile devices 100, IVR 210, ACSS 220, diagnostic middleware 240 and remote access middleware 250 may each have the same or similar components, in a same or similar configuration, to that of device 300 shown in FIG. 3. Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the elements of device 300.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit an operator (or user) to input information to device 300, such as, for example, a keypad or a keyboard, a touch screen display with a touch sensitive panel, voice recognition and/or biometric mechanisms, etc. Output device 370 may include one or more mechanisms that output information to the operator, including a display, a speaker, etc. In the case of device 300 being a mobile device 100, input device 360 and output device 370 may include a touch screen display that displays information associated with the operation of mobile device 100, and which receives user touch input from customer 145.

Communication interface(s) 380 may include a transceiver that enables device 300 to communicate with other devices and/or systems. For example, communication interface(s) 380 may include wired or wireless transceivers for communicating via network(s) 230. In the case of wireless transceivers, communication interface(s) 380 may include a cellular network transceiver, a BlueTooth transceiver, and/or a Wi-Fi transceiver. For example, device 300 may include both a cellular network transceiver, for communicating via a PLMN of network(s) 230, and a Wi-Fi transceiver for communicating via a LAN of network(s) 230.

The configuration of components of device 300 illustrated in FIG. 3 is for illustrative purposes only. Other configurations may be implemented. Therefore, device 300 may include additional, fewer and/or different components, or differently arranged components, than those depicted in FIG. 3.

Figure 4:
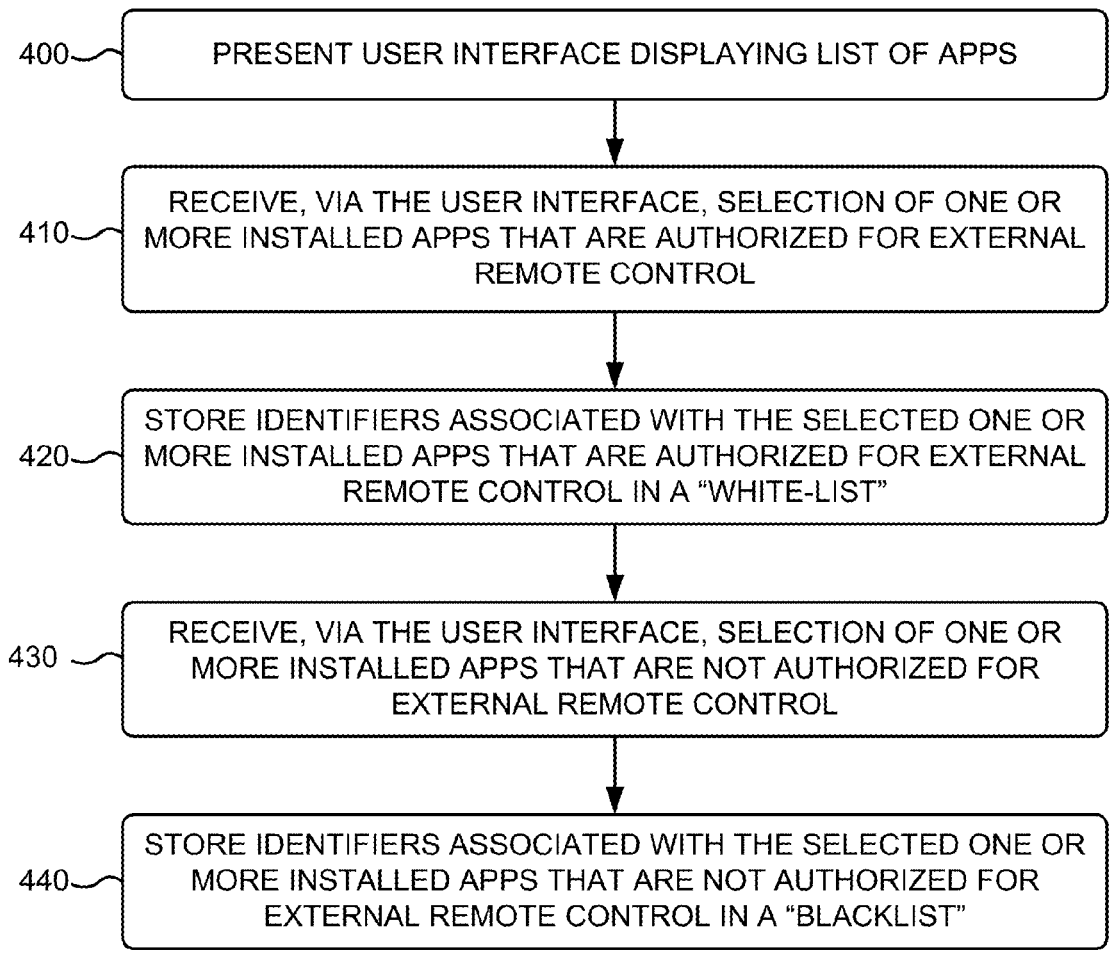
FIG. 4 is a flow diagram that illustrates an exemplary process for receiving selections of "white-listed" and/or "black-listed" apps that are authorized/not authorized for external remote control by a call center customer representative.

FIG. 4 is a flow diagram that illustrates an exemplary process for receiving selections of "white-listed" and/or "black-listed" apps, installed on a mobile device, that are authorized/not authorized for external remote control by customer representative 115. In one implementation, the exemplary process of FIG. 4 may be implemented by a management node (not shown in FIG. 2) associated with a PLMN of network(s) 230, possibly in conjunction with ACSS20 and/or middleware 130. The exemplary process of FIG. 4 is described below with reference to FIG. 5. The exemplary process of FIG. 4 depicts a manual process by which selection of apps for "white-listing" is performed manually by a mobile network administrator or operator. In a different implementation, selection of apps for "white-listing" may occur automatically based on, for example, security or data sensitivity considerations associated with each app. In such an "automatic" implementation, after automatic selection of the apps for a "white-list" or a "black-list," blocks 420 and 440 of FIG. 4 may be performed to store the app identifiers (e.g., at a node within the PLMN), and the "white-list" or "black-list" may be distributed to the mobile device 100.

Figure 5:
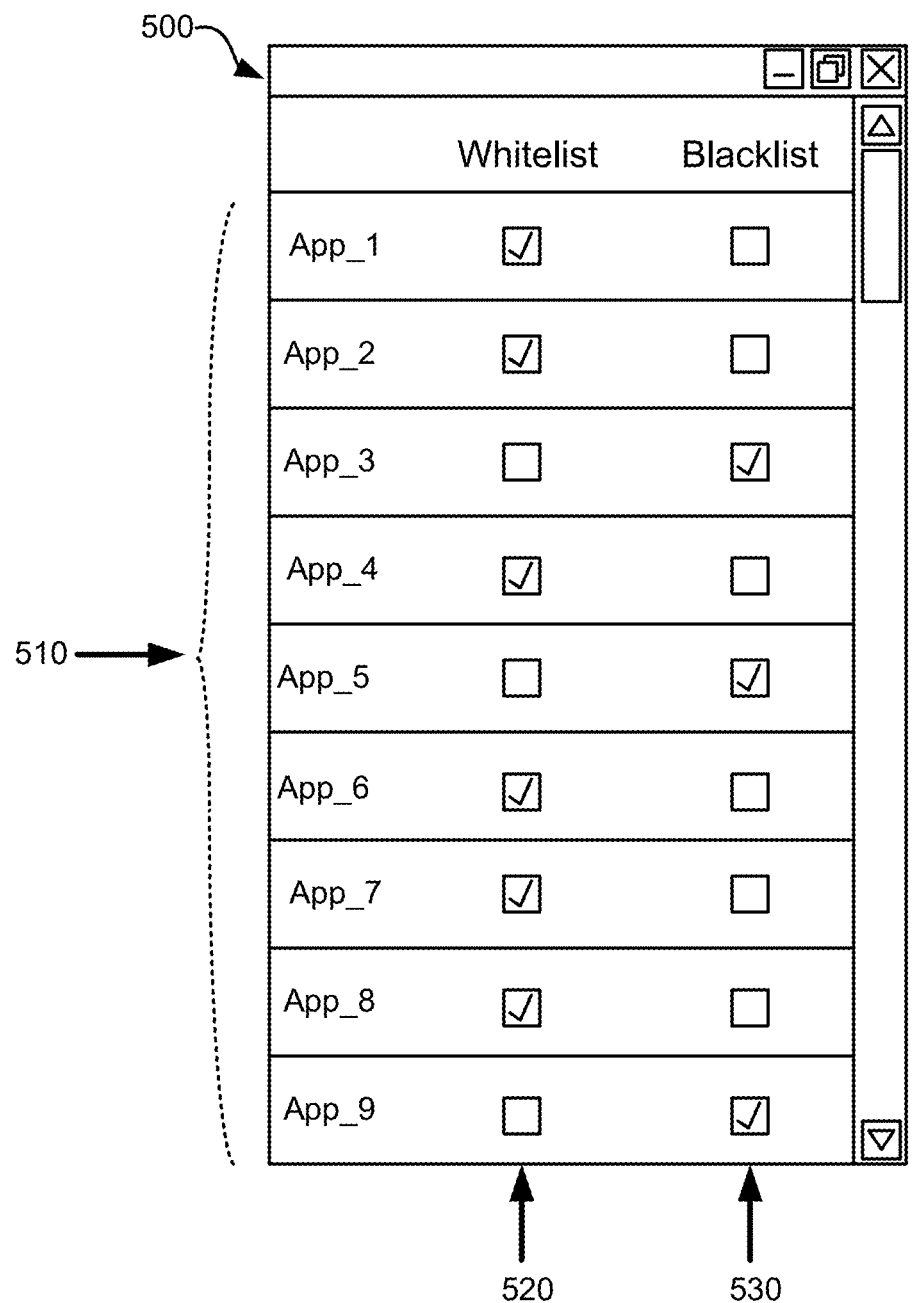
FIG. 5 depicts an exemplary user interface that may be used in the exemplary process of FIG. 4.

The exemplary process may include the presentation of a user interface displaying a list of apps (block 400). FIG. 5 depicts an exemplary user interface 500 that may be displayed at a device via, for example, a touch screen display. User interface 500 of FIG. 5 presents a list 510 of apps, where each app on the list is selectable for placing the app on a "white-list" or a "black-list."

Selection of one or more installed apps, which are authorized for external remote control, is received via the user interface (block 410). As shown in the exemplary user interface 500 of FIG. 5, a network administrator or operator may select (e.g., apply a touch via a touch screen display) a "white-list" checkbox 520 associated with an app contained within a list 510 of apps. Selection of an app for placement of the app in a "white-list" indicates that the network administrator or operator has specified that app for remote control by customer representative 115. Identifiers associated with the selected one or more installed apps that are authorized for external remote control are stored in a "white-list" (block 420). The "white-list" may include a small file containing a list of the identifiers of all of the selected apps that are authorized for external remote control. The "white-list" may be stored in memory at ACSS 220, at middleware 130, and/or at another node in network(s) 230.

Selection of one or more installed apps, which are not authorized for external remote control, is received via the user interface (block 430). As shown in the exemplary user interface 500 of FIG. 5, the network administrator or operator may select (e.g., apply a touch via a touch screen display) a "black-list" checkbox 530 associated with an app contained within the list 510 of apps. Selection of an app for placement of the app in a "black-list" indicates that the network administrator or operator has specified that remote control by customer representative 115 for that particular app is to be blocked (i.e., not permitted). Identifiers associated with the selected one or more installed apps that are not authorized for external remote control are stored in a "black-list" (block 440). The "black-list" may include a small file containing a list of the identifiers of all of the selected apps that are not authorized for external remote control. The "black-list" may be stored in memory at ACSS 220, at middleware 130, and/or at another node in network(s) 230. In one implementation, during the remote access process, described with respect to FIGS. 6A-6C below, apps (e.g., currently executing apps) not contained in the "white-list," or apps contained in the "black-list," may be automatically shut down prior to establishment of a connection between mobile device 100 and middleware 130.

The exemplary process of FIG. 4 may be selectively repeated to "white-list" and/or "black-list" apps. In some embodiments, blocks 410 and 420 may be excluded from the process of FIG. 4. In such embodiments, the network administrator or operator may only "black-list" selected apps from a list of applications. In other embodiments, blocks 430 and 440 may be excluded from the process of FIG. 4. In these embodiments, the network administrator or operator may only "white-list" selected apps from a list of applications. When the process of FIG. 4 is repeated, a new "white-list" and/or a new "black-list" is generated for storage, and the new "white-list" or "black-list" may replace any previously stored versions.

Figure 6A:
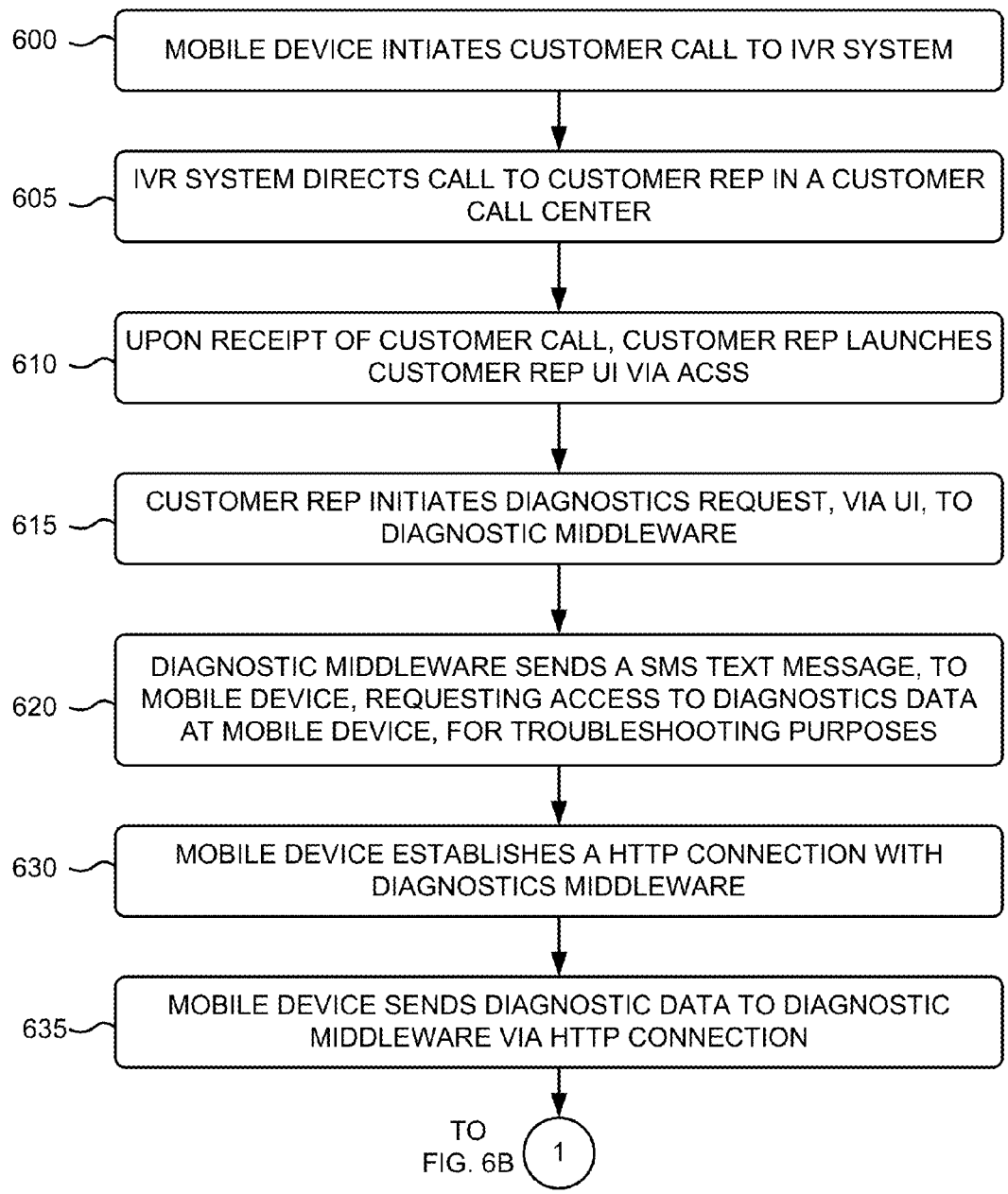
FIGS. 6A-6C are flow diagrams that illustrate an exemplary process for establishing a remote access session between a call center customer representative and a mobile device via a network.
Figure 6B:
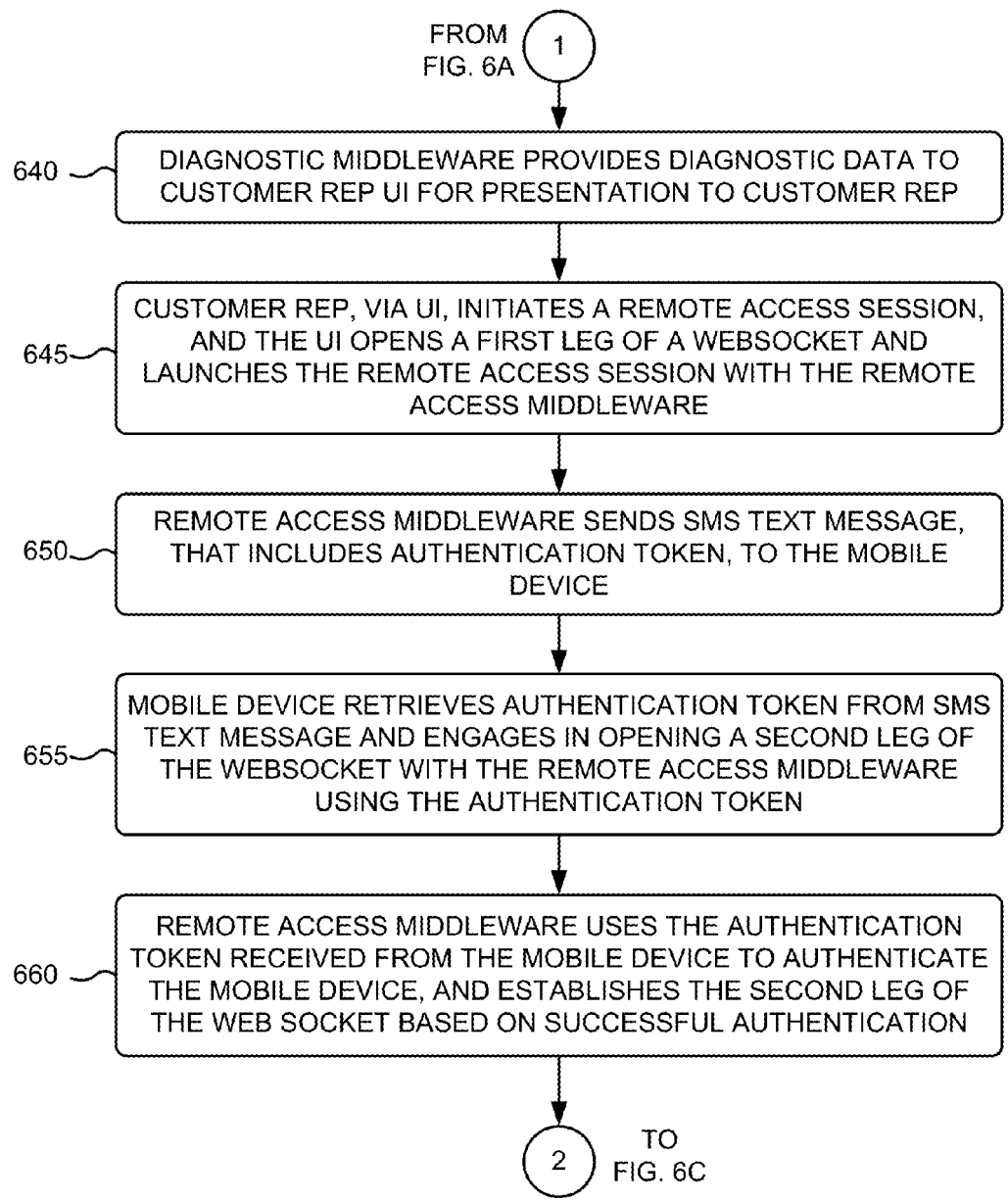
Figure 6C:
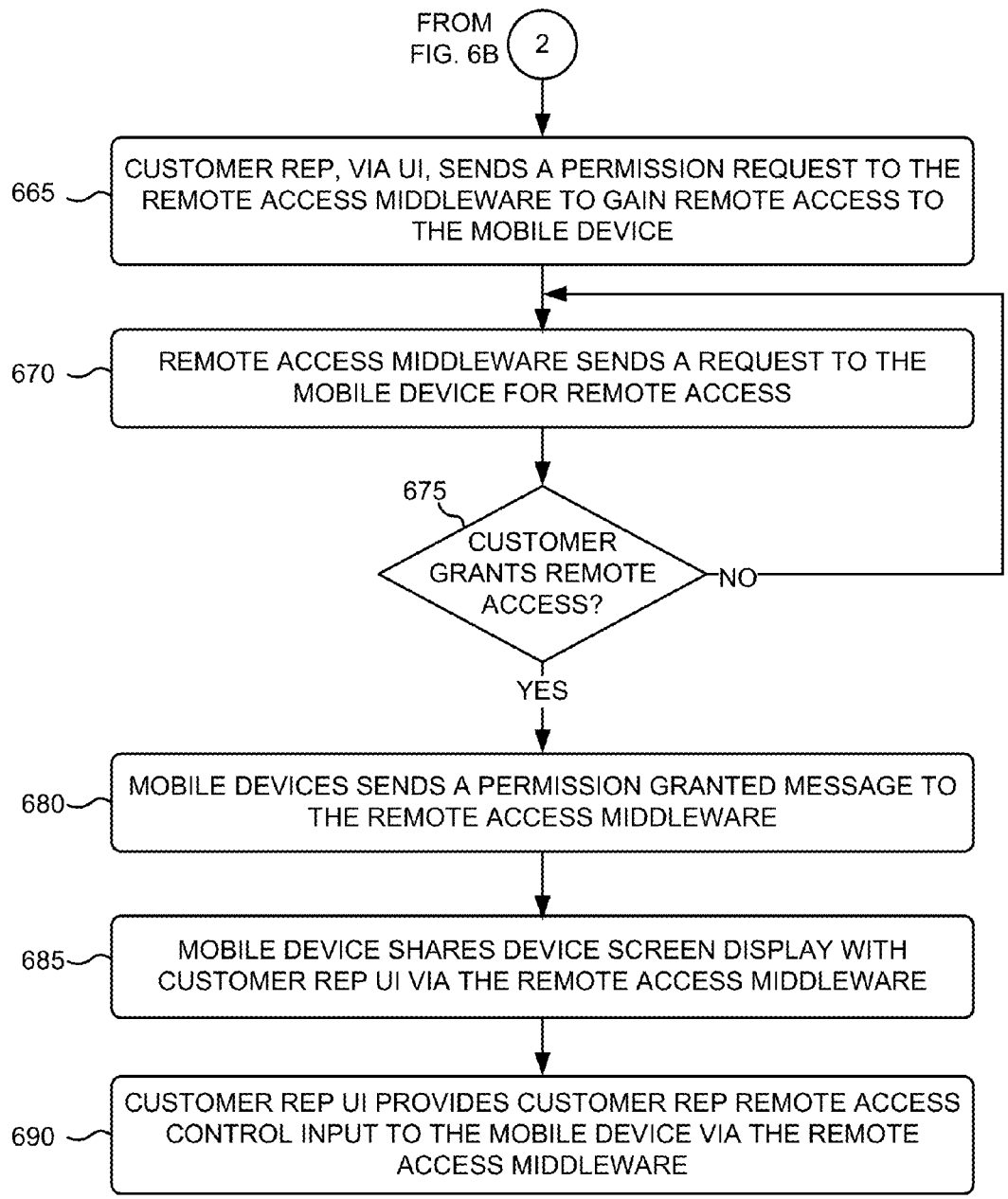

FIGS. 6A-6C are flow diagrams that illustrate an exemplary process for establishing a remote access session between a customer representative 115 and a mobile device 100 via network(s) 230. The exemplary process of FIGS. 6A-6C may be implemented by middleware 130, in conjunction with IVR 210, ACSS 220, and mobile device 100. The exemplary process of FIGS. 6A-6C is described below with reference to FIGS. 7-12.

Figure 7:
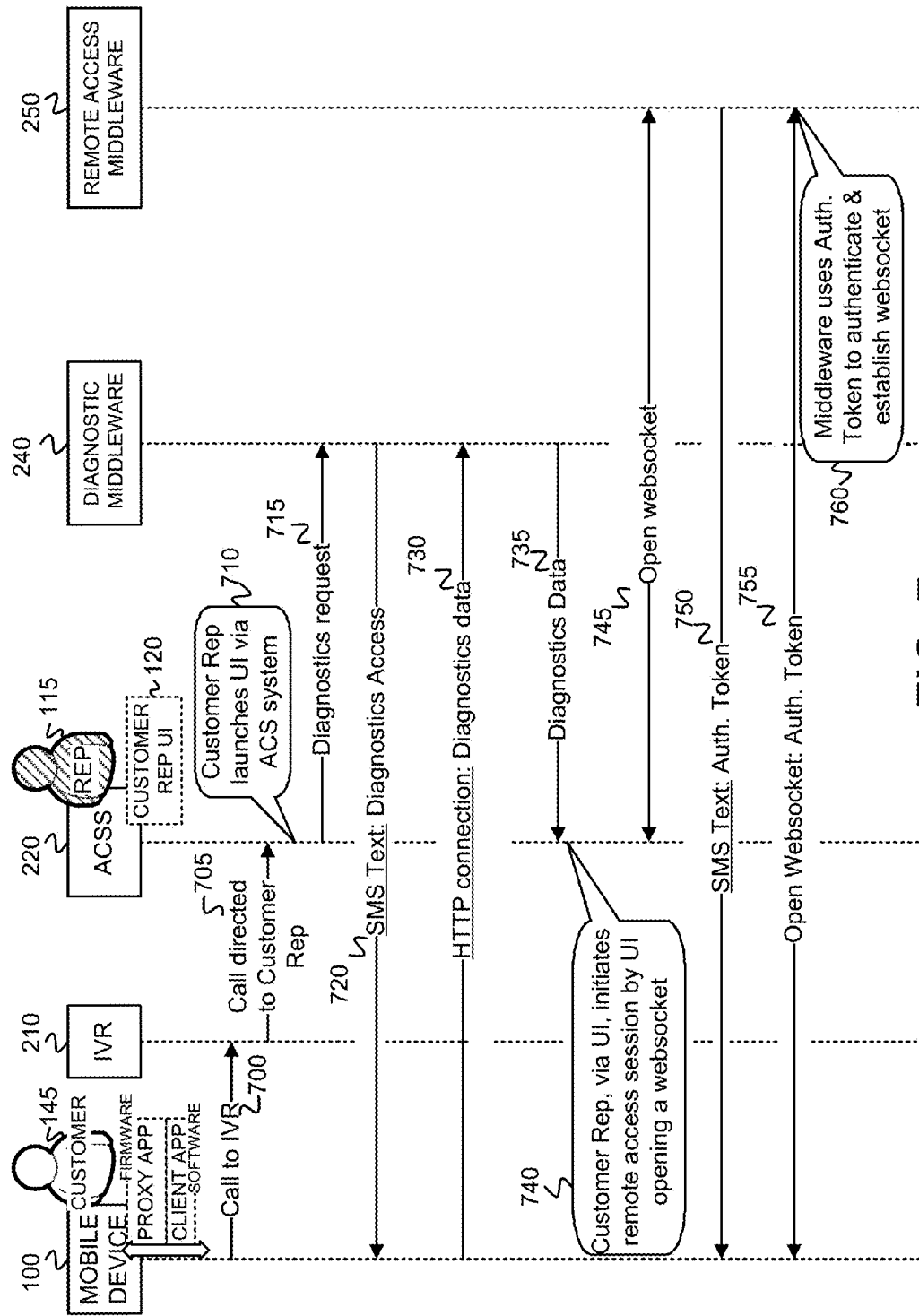
FIGS. 7 and 8 are messaging diagrams associated with the exemplary process of FIGS. 6A-6C.

The exemplary process may include mobile device 100 initiating a customer call to IVR system 210 (block 600). Customer 145 at mobile device 100 may dial a 1-800 toll free number to connect a call from mobile device 100 to IVR system 210 via a PLMN of network(s) 230. FIG. 7 depicts customer 145 initiating a customer call 700 to IVR system 210. IVR system 210 directs the call to customer representative 115 in a customer call center associated with ACSS 220 (block 605). Upon receipt of customer call from mobile device 100, IVR 210 provides automated responses that enable customer 145 to select an automated option of "customer representative support." Upon selection of this option by customer 145, IVR system 210 re-directs the call 705 (FIG. 7) to ACSS 220. Upon receipt of the customer call, customer representative 115 launches customer representative user interface 120 via ACSS 220 (block 610), and initiates a diagnostics request, via UI 120, to diagnostic middleware 240 (block 615). FIG. 7 depicts customer representative 115 launching 710 UI 120 via ACSS 220, and UI 120 sending a message 715 containing a diagnostics data request to diagnostic middleware 240. The diagnostics data request requests diagnostic data related to the operation of mobile device 100, and/or operation of a specific app executing at mobile device 100.

Upon receiving the diagnostics request from UI 120 of ACSS 220, diagnostic middleware 240 sends a SMS text message to mobile device 100, for accessing diagnostics data at mobile device 100 for troubleshooting purposes (block 620). FIG. 7 depicts diagnostic middleware 240 sending a SMS text message 720 to mobile device 100, where SMS text message 720 requests access to diagnostics data at mobile device 100. Upon receipt of the SMS text message from diagnostic middleware 240, then remote access client app 110 at mobile device 100 establishes a Hypertext Transfer Protocol (HTTP) connection with diagnostic middleware 240 (block 630). In one implementation, the HTTP connection may include a long-lived HTTP connection. Remote access client app 110 at mobile device 100 then sends diagnostic data to diagnostic middleware 240 via the established HTTP connection (block 635). FIG. 7 shows mobile device 100 sending diagnostics data 730 to diagnostic middleware 240 via a HTTP connection. Diagnostic middleware 240 provides the diagnostic data to customer representative UI 120 for presentation to customer representative 115 (block 640). FIG. 7 shows diagnostic middleware 240 sending the diagnostics data 735 to customer representative UI 120 via ACSS 220. Customer representative 115 may view and analyze the received diagnostics data for assistance in troubleshooting problems at mobile device 100.

Customer representative 115, via UI 120, initiates a remote access session, and the UI 120 opens a first leg of a websocket and launches the remote access session with remote access middleware 250 (block 645). Upon receipt of diagnostics data from diagnostic middleware 240, customer representative 115 may view the diagnostics data via UI 120, and may, as shown in FIG. 7, initiate 740 a remote access session by UI 120 opening 745 the first leg of the websocket (i.e., websocket 125 of FIG. 1) between UI 120 and remote access middleware 250.

Subsequent to the launching of the remote access session by customer representative 115, remote access middleware 250 sends a SMS text message, which includes an authentication token, to remote access client app 110 at mobile device 100 (block 650). FIG. 7 depicts remote access middleware 250 sending a SMS text message 750, that includes an authentication token, to mobile device 100. Remote access client app 110 at mobile device 100 retrieves the authentication token from the SMS text message and engages in opening a second leg of a websocket with the remote access middleware 250 using the authentication token (block 655). FIG. 7 depicts mobile device 100 and remote access middleware 250 engaging in opening 755 a second leg of the websocket using the authentication token received by mobile device 100. Remote access middleware 250 uses the authentication token received from the mobile device 100 to authenticate the mobile device 100, and establishes the second leg of the websocket based on successful authentication (block 660). Remote access middleware 250 obtains the authentication token received from mobile device 100, and compares the received authentication token with the authentication token previously sent from remote access middleware 250 to mobile device 100 (i.e., at block 650). If the tokens match, then remote access middleware 250 considers mobile device 100 to be "authenticated." The websocket opened between mobile device 100 and remote access middleware 250 establishes full duplex communication between the customer representative UI 120 and mobile device 100, with the full duplex communication between UI 120 and mobile device 100 including the first leg of the websocket between UI 120 and remote access middleware 250, and the second leg of the websocket between remote access middleware 250 and mobile device 100. The websocket, thus, includes two legs of a single websocket that provide full duplex communication between UI 120 and mobile device 100. FIG. 7 depicts remote access middleware 250 using the authentication token received from mobile device 100 to authenticate 760 mobile device 100, and if successfully authenticated, to permit the establishment of the websocket between mobile device 100 and remote access middleware 250.

Figure 8:
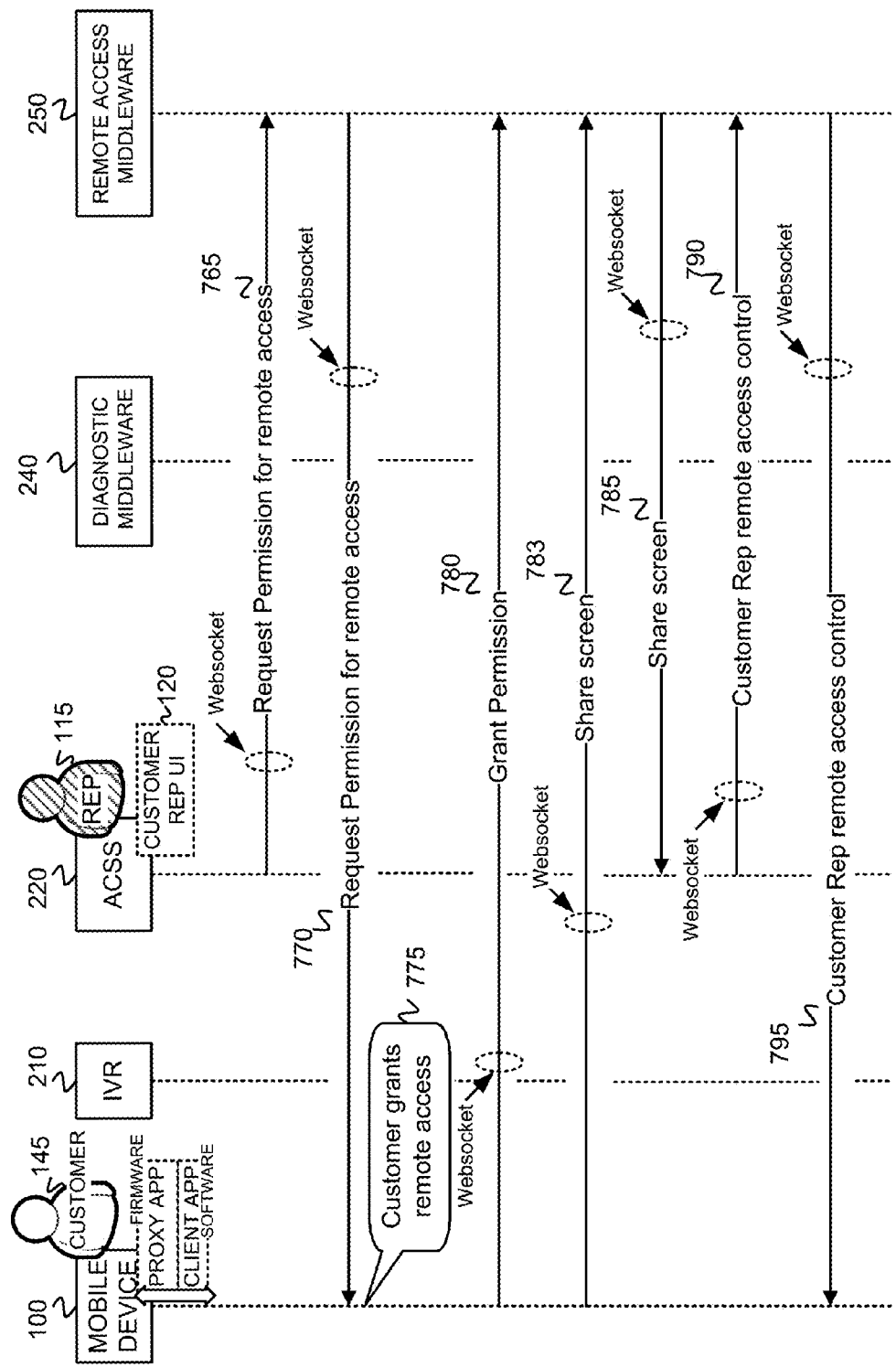
Figure 9:
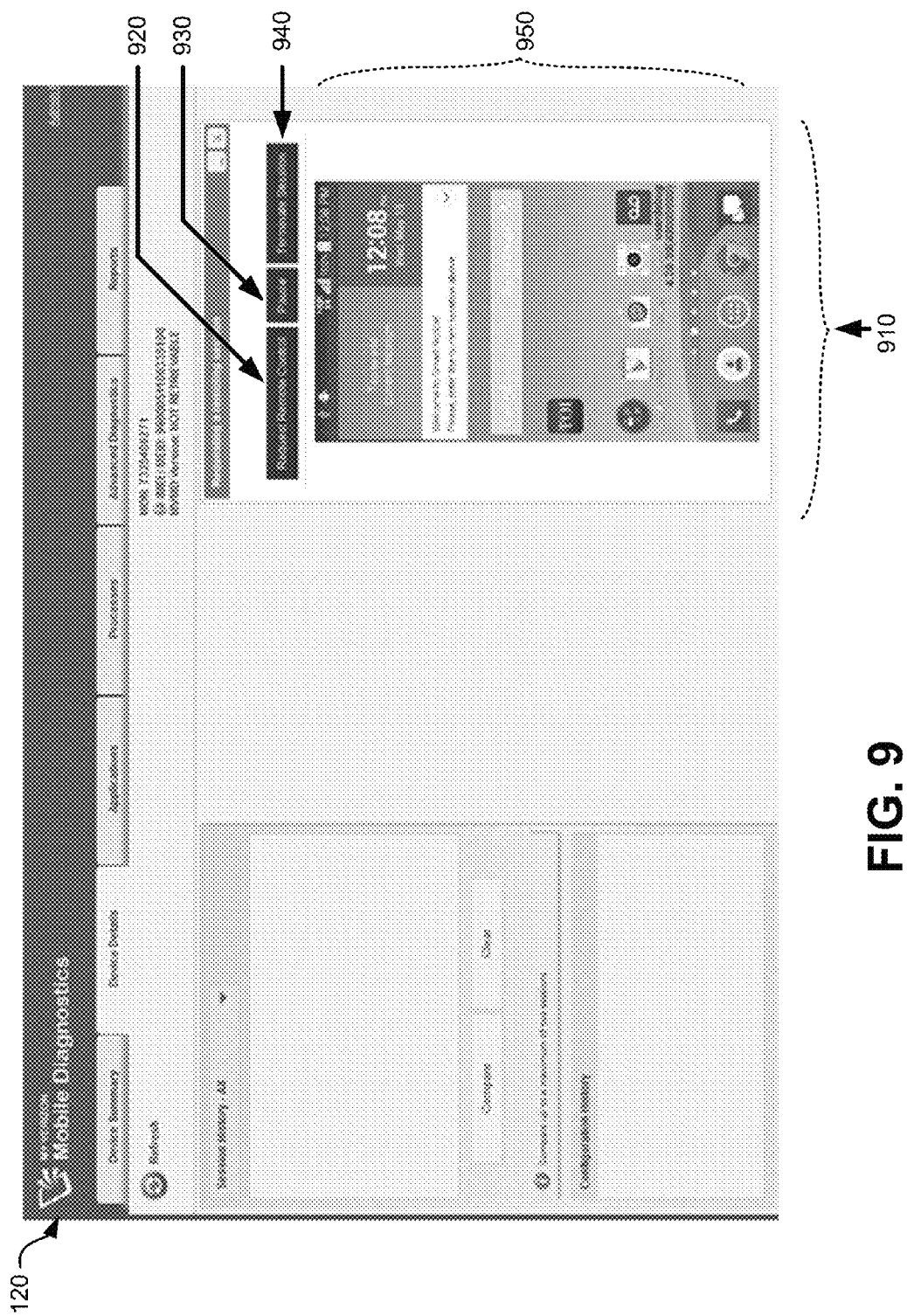
FIG. 9 depicts an example of a customer representative user interface that enables a call center customer representative to request remote access sessions with mobile devices.

Customer representative 115, via UI 120, sends a permission request to remote access middleware 250 to gain remote access to mobile device 100 (block 665). Subsequent to opening the websocket, customer representative 115 proceeds with the remote access session by sending via the websocket, as shown in FIG. 8, a message 765 that requests permission for remote access at mobile device 100. The message 765 requesting permission for remote access is sent between UI 120 and remote access middleware 250 over a first leg of the full duplex websocket. Remote access middleware 250 sends a request to mobile device 100 for remote access (block 670). Remote access middleware 250 acts as an intermediary between UI 120 and mobile device 100, and receives the message 765 from UI 120 and, in turn, sends, as shown in FIG. 8, a corresponding message 780 to mobile device 100, via a second leg of the websocket, that requests permission for customer representative 115 to remotely access mobile device 100. FIG. 9 depicts an example of customer representative UI 120, where UI 120 includes a button 920 for requesting a remote viewing and/or remote control session with mobile device 100. Upon selection of button 920 by customer representative 115, and upon acceptance of the request for remote viewing and/or control by customer 145, a captured screen display 950 from mobile device 100 may be presented within a window 910 of UI 120. As further shown, the example UI 120 includes a "pause" button 930 that enables customer representative 115 to pause the remote viewing and/or control session, and a "terminate session" button 940 that enables customer representative 115 to terminate a current remote viewing and/or control session with mobile device 100.

Figure 10:
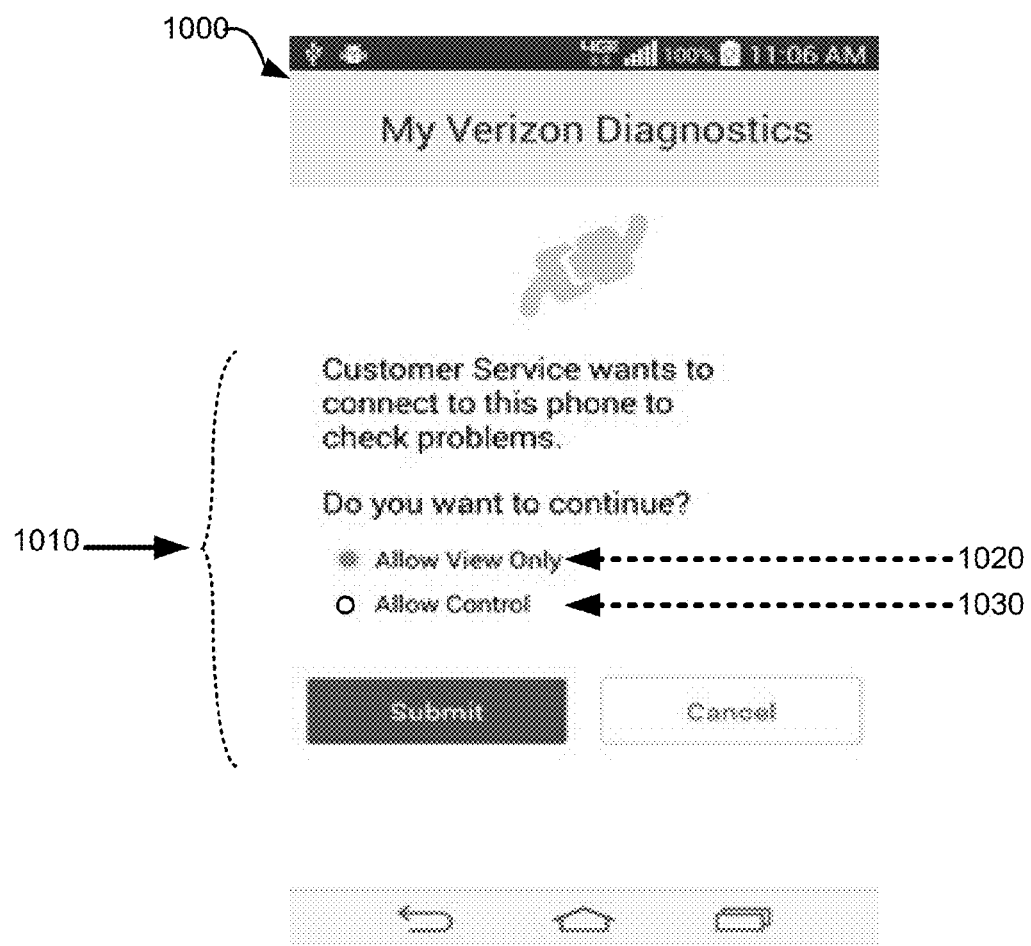
FIGS. 10 and 11 depict examples of user interfaces implemented at a mobile device during the exemplary process of FIGS. 6A-6C.
Figure 11:
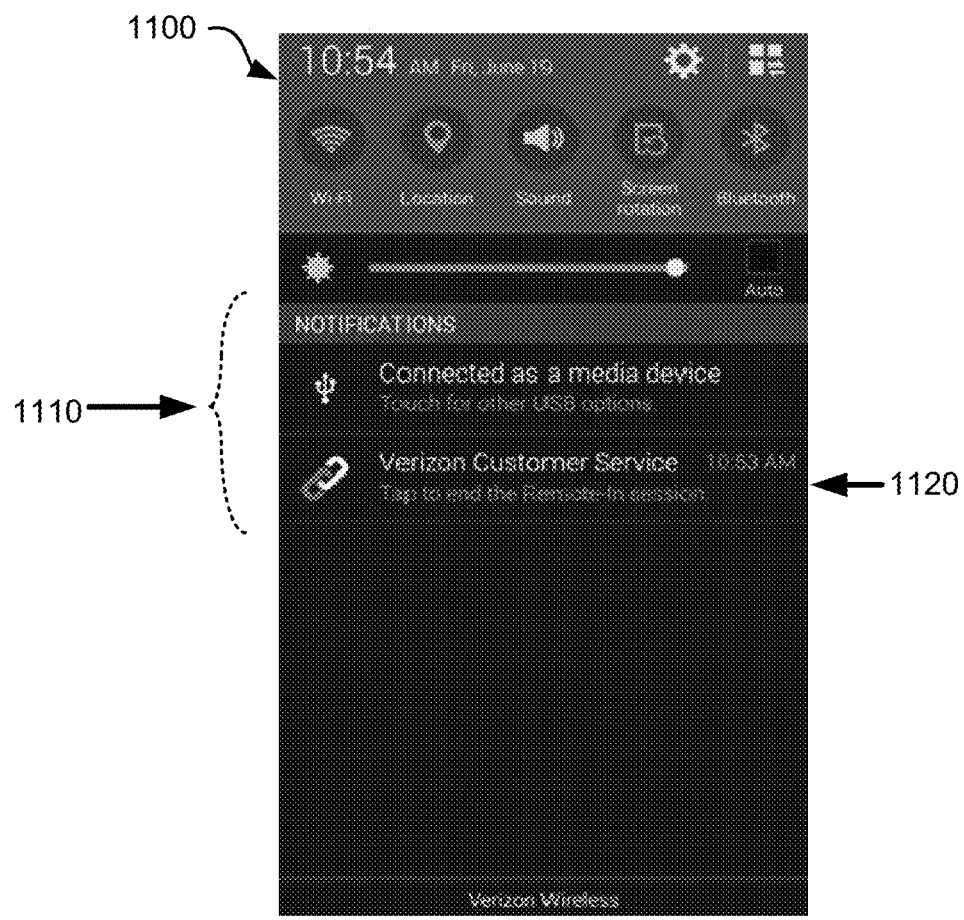

Remote access client app 110 at mobile device 100 determines if customer 145 grants remote access to mobile device 100 (block 675). FIG. 10 depicts an example user interface 1000, implemented at mobile device 100, which includes selectable options 1010 for permitting screen viewing and/or remote control input by customer representative 115. For example, the selectable options 1010 may enable customer 145 to select 1020 whether customer representative 115 is allowed to only view a captured version of the screen display at mobile device 100, or to select 1030 whether customer representative 115 is allowed both viewing of the captured version of the screen display at mobile device 100, and remote control of mobile device 100. If remote access client app 110 at mobile device determines that customer 145 has not granted remote access to mobile device 100 (NO—block 675), the exemplary process may return to block 670. Alternatively, the exemplary process may end, with no remote access session being established between UI 120 and mobile device 100.

If remote access client app 110 at mobile device 100 determines that customer 145 has granted remote access (YES—block 675), then remote access client app 110 at mobile device 100 may send a permission granted message to the remote access middleware 250 granting remote access (block 680). FIG. 8 depicts mobile device 100 sending, via a second leg of the websocket, a permission granted message 780 to remote access middleware 250. The grant of remote access from customer 145 may include "screen display view" only, or may include "screen display view" and "remote input control." In a remote access grant involving "screen display view" only mode, only block 685 below may be performed (i.e., block 690 is not performed). In a remote access grant involving both "screen display view" and "remote input control," blocks 685 and 690 below may be performed. Mobile device 100 shares the device screen display with customer representative UI 120 via the remote access middleware 250 (block 685). FIG. 8 shows mobile device 100 sharing 783 the screen with remote access middleware 250 via the second leg of the websocket which, in turn, shares 785 the screen with customer representative UI 120 via the first leg of the websocket. As shown in FIG. 8, the sharing of the screen display of mobile device 100 occurs via the previously established websocket between mobile device 100 and customer representative UI 120. Customer representative UI 120 provides the customer representative 115 remote access control input to the mobile device 100 via the websocket and remote access middleware 250 (block 690). As depicted in FIG. 8, UI 120 sends remote access control input 790, received from customer representative 115, via the first leg of the websocket to remote access middleware 250. In turn, as further shown in FIG. 8, remote access middleware 250 sends the remote access control input 795 via the second leg of the n websocket to mobile device 100. At any time, during performance of blocks 685 and 690, customer 145 at mobile device 100 may end the remote session. In the example user interface 1100 of FIG. 11, a notifications section 1110 presented on mobile device 100 may include a selectable option 1120 to end the remote session between UI 120 and mobile device 100 (via remote access middleware 250). Selection of option 1120 by customer 145 at mobile device 100 terminates the remote session, and closes the websocket between mobile device 100 and remote access middleware 250, and between remote access middleware 250 and UI 120 at ACSS 220.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4 and 6A-6C, the order of the blocks may be varied in other implementations. Moreover, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   opening, at a first device based on a call to an Interactive Voice Response (IVR) system to receive assistance for a customer at a mobile device, a first leg of a websocket with a system associated with a call center customer representative;
   sending a first Short Message Service (SMS) text message from the first device to the mobile device, wherein the first SMS text message includes a first authentication token;
   receiving, while attempting to establish a second leg of the websocket between the first device and the mobile device, a second authentication token from the mobile device;
   authenticating, by the first device, the mobile device based on the received second authentication token;
   opening the second leg of the websocket between the first device and the mobile device based on whether the authentication of the second authentication token is successful;
   sending, from the first device to the mobile device, an access permission request, wherein the access permission request includes an indication of a plurality of types of remote access, wherein the plurality of types of remote access includes a first type of remote access and a second type of remote access, wherein the first type of remote access comprises provisioning of captured screen displays of the mobile device to the call center customer representative, and wherein the second type of remote access comprises enabling remote controlling of the mobile device by the call center customer representative;
   receiving, by the first device from the mobile device, a grant of remote access from the customer at the mobile device, wherein the grant of remote access includes a customer-specified indication of either the first type of remote access or the second type of remote access; and
   selectively performing, based on whether the grant of remote access includes the customer-specified indication of the first type of remote access or the second type of remote access, one of the following:
   1) receiving, at the first device via the second leg of the websocket, captured display screens from the mobile device and sending, from the first device via the first leg of the websocket, the captured display screens to the system associated with the call center customer representative for presentation to the call center customer representative, or
   2) receiving, at the first device from the call center customer representative via the first leg of the websocket, remote access control input, and providing, from the first device to the mobile device via the second leg of the websocket, the remote access control input for remote controlling of the mobile device.

2. The method of claim 1, further comprising:
   sending, from a second device to the mobile device and responsive to the call to receive assistance, a second SMS text message, wherein the second SMS text message requests access to diagnostics data at the mobile device;
   receiving, at the second device from the customer, an acceptance of the request for access;
   establishing, based on the acceptance of the request for access, a connection between the second device and the mobile device;
   receiving, at the second device, diagnostics data from the mobile device via the connection; and
   sending the diagnostics data, from the second device, to the system associated with the call center customer representative.

3. The method of claim 1, wherein the assistance relates to troubleshooting assistance regarding operation of the mobile device.

4. The method of claim 1, further comprising:
   receiving, at the first device, manual input from the customer to terminate a remote access session; and
   closing the second leg of the websocket between the first device and the mobile device based on the manual input.

5. The method of claim 1, wherein the remote access control input comprises input for controlling the operation of the mobile device received from the call center customer representative.

6. The method of claim 1, wherein authenticating the mobile device comprises:
   comparing the first authentication token with the second authentication token, wherein comparing the first authentication token with the second authentication token comprises determining if the first authentication token and the second authentication token are a same authentication token, and
   authenticating the mobile device based on results of the comparison.

7. The method of claim 1, wherein receiving, at the first device, the captured display screens further comprises:
   receiving first frames, associated with the captured display screens from the mobile device, via the second leg of the websocket;
   dynamically controlling, by the first device, a first rate at which the first frames are received from the mobile device at the first device to match a second rate at which the first frames are processed by a user interface of the system associated with the call center customer representative; and sending the first frames, received at the first rate, to the system associated with the call center customer representative via the first leg of the websocket for presentation to the call center customer representative.

8. A system, comprising:
a first device comprising:
  a first communication interface; and
  a first processing unit configured to:
    open, via the first communication interface based on receiving an assistance call from a customer at a mobile device, a first leg of a websocket with a system associated with a call center customer representative,
    open, via the first communication interface, a second leg of the websocket between the first device and the mobile device,
    send, via the first communication interface to the mobile device, an access permission request, wherein the access permission request includes an option for choosing a type of remote access of a plurality of types of remote access, wherein the plurality of types of remote access includes a first type of remote access and a second type of remote access, wherein the first type of remote access comprises provision of captured screen displays of the mobile device to the call center customer representative, and wherein the second type of remote access comprises enabling remote controlling of the mobile device by the call center customer representative,
    receive, via the first communication interface from the mobile device, a grant of remote access from the customer at the mobile device, wherein the grant of remote access includes a customer-specified indication of either the first type of remote access or the second type-of remote access that is granted, and
    selectively perform, based on whether the grant of remote access includes the customer-specified indication of the first type of remote access or the second type of remote access, one of the following:
      1) receive captured display screens from the mobile device via the second leg of the websocket, and send the captured display screens to the system associated with the call center customer representative via the first leg of the websocket for presentation to the call center customer representative, or
      2) receive, from the call center customer representative via the first leg of the websocket, remote access control input, and provide, via the second leg of the websocket to the mobile device, the remote access control input for remote controlling of the mobile device.

9. The system of claim 8, further comprising:
a second device comprising:
  a second communication interface; and
  a second processing unit configured to:
    receive, from the call center customer representative via the second communication interface, a request for diagnostics data related to the mobile device,
    send, responsive to the request, a Short Message Service (SMS) text message to the mobile device, where the SMS text message requests diagnostics access to the mobile device for troubleshooting purposes,
    receive, via a connection with the mobile device and responsive to the SMS text message, diagnostics data related to operation of the mobile device, and
    send, via the second communication interface to the call center customer representative, the diagnostics data.

10. The system of claim 8, wherein the first processing unit of the first device is further configured to:
  send a Short Message Service (SMS) text message to the mobile device, wherein the SMS text message includes a first authentication token,
  receive, while attempting to establish the second leg of the websocket between the first device and the mobile device, a second authentication token from the mobile device,
  authenticate the mobile device based on the received second authentication token,
  wherein, when opening the second leg of the websocket, the first processing unit of the first device is further configured to:
    open the second leg of the web socket between the first device and the mobile device based on whether the authentication of the second authentication token is successful.

11. The system of claim 10, wherein, when authenticating the mobile device, the first device is further configured to:
  compare the first authentication token with the second authentication token, and
  authenticate the mobile device based on results of the comparison.

12. The system of claim 11, wherein, when comparing the first authentication token with the second authentication token, the first processing unit of the first device is further configured to:
  determine if the first authentication token and the second authentication token are a same authentication token, and
  authenticate the mobile device when the first authentication token and the second authentication token are the same authentication token.

13. The system of claim 8, wherein, when receiving the captured display screens, the first processing unit of the first device is further configured to:
  receive first frames, associated with the captured display screens from the mobile device, via the second leg of the websocket;
  dynamically control a first rate at which the first frames are received from the mobile device at the first device to match a second rate at which the first frames are processed by a user interface of the system associated with the call center customer representative; and
  send the first frames, received at the first rate, to the system associated with the call center customer representative via the first leg of the websocket for presentation to the call center customer representative.

14. A non-transitory computer-readable medium comprising instructions, the instructions comprising:
  one or more instructions that, when executed by a processor of a first device, cause the processor to:
    open, based on a call to an Interactive Voice Response (IVR) system to receive assistance for a customer at a mobile device, a first leg of a websocket with a system associated with a call center customer representative;

send a first Short Message Service (SMS) text message to the mobile device, wherein the first SMS text message includes a first authentication token;

receive, while attempting to establish a second leg of the websocket between the first device and the mobile device, a second authentication token from the mobile device;

authenticate the mobile device based on the received second authentication token;

open the second leg of the websocket between the first device and the mobile device based on whether the authentication of the second authentication token is successful;

send, to the mobile device, an access permission request, wherein the access permission request includes an indication of a plurality of types of remote access, wherein the plurality of types of remote access includes a first type of remote access and a second type of remote access, wherein the first type of remote access comprises provisioning of captured screen displays of the mobile device to the call center customer representative, and wherein the second type of remote access comprises enabling remote controlling of the mobile device by the call center customer representative;

receive, from the mobile device, a grant of remote access from the customer at the mobile device, wherein the grant of remote access includes a customer-specified indication of either the first type of remote access or the second type of remote access; and selectively perform, based on whether the grant of remote access includes the customer-specified indication of the first type of remote access or the second type of remote access, one of:

1) receive, via the second leg of the websocket, captured display screens from the mobile device and send, via the first leg of the websocket, the captured display screens to the system associated with the call center customer representative for presentation to the call center customer representative, or 2) receive, from the call center customer representative via the first leg of the websocket, remote access control input, and provide, from the first device to the mobile device via the second leg of the websocket, the remote access control input for remote controlling of the mobile device.

15. The non-transitory computer-readable medium of claim 14, wherein the assistance relates to troubleshooting assistance regarding operation of the mobile device.

16. The non-transitory computer-readable medium of claim 14, wherein the instructions further comprise:
one or more instructions that cause the processor to:
receive manual input from the customer to terminate a remote access session; and
close the second leg of the websocket between the first device and the mobile device based on the manual input.

17. The non-transitory computer-readable medium of claim 14, wherein the remote access control input comprises input for controlling the operation of the mobile device received from the call center customer representative.

18. The non-transitory computer-readable medium of claim 14, wherein the one or more instructions that cause the processor to authenticate the mobile device further comprise:
one or more instructions that cause the processor to:
compare the first authentication token with the second authentication token by determining if the first authentication token and the second authentication token are a same authentication token, and
authenticate the mobile device based on results of the comparison.

19. The non-transitory computer-readable medium of claim 14, wherein the one or more instructions that cause the processor to receive the captured display screens further comprise:
one or more instructions that cause the processor to:
receive first frames, associated with the captured display screens from the mobile device, via the second leg of the websocket;
dynamically control a first rate at which the first frames are received from the mobile device at the first device to match a second rate at which the first frames are processed by a user interface of the system associated with the call center customer representative; and
send the first frames, received at the first rate, to the system associated with the call center customer representative via the first leg of the websocket for presentation to the call center customer representative.

* * * * *